(12) United States Patent
Matsushita et al.

(10) Patent No.: US 9,283,918 B2
(45) Date of Patent: Mar. 15, 2016

(54) CURTAIN AIRBAG

(75) Inventors: Tetsuya Matsushita, Yokohama (JP);
Atsushi Nakashima, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 121 days.

(21) Appl. No.: 13/194,433

(22) Filed: Jul. 29, 2011

(65) Prior Publication Data

US 2012/0025502 A1 Feb. 2, 2012

(30) Foreign Application Priority Data

Jul. 30, 2010 (JP) .................................. 2010-173199

(51) Int. Cl.
*B60R 21/213* (2011.01)
*B60R 21/214* (2011.01)
*B60R 21/231* (2011.01)
*B60R 21/232* (2011.01)
*B60R 21/08* (2006.01)

(52) U.S. Cl.
CPC ............... *B60R 21/232* (2013.01); *B60R 21/08* (2013.01); *B60R 21/213* (2013.01); *B60R 21/214* (2013.01); *B60R 21/231* (2013.01)

(58) Field of Classification Search
CPC .. B60R 21/213; B60R 21/214; B60R 21/231; B60R 21/232
USPC ................................ 280/730.1, 730.2, 743.1
See application file for complete search history.

(56) References Cited

U.S. PATENT DOCUMENTS

| | | | | |
|---|---|---|---|---|
| 6,000,715 A * | 12/1999 | Tschaeschke | .............. | 280/730.2 |
| 6,129,377 A * | 10/2000 | Okumura et al. | .......... | 280/730.2 |
| 6,155,596 A * | 12/2000 | Nakajima et al. | .......... | 280/730.2 |
| 6,234,516 B1 * | 5/2001 | Boxey | ........................ | 280/730.2 |
| 6,276,712 B1 * | 8/2001 | Welch et al. | ................ | 280/730.2 |
| 6,305,707 B1 * | 10/2001 | Ishiyama et al. | ........... | 280/728.2 |
| 6,361,069 B1 * | 3/2002 | Saito et al. | .................. | 280/730.2 |
| 6,375,214 B1 * | 4/2002 | Nishikaji | ................... | 280/728.2 |
| 6,386,578 B1 * | 5/2002 | Nanbu et al. | ............... | 280/730.2 |
| 6,530,594 B1 * | 3/2003 | Nakajima et al. | .......... | 280/730.2 |
| 6,644,687 B2 * | 11/2003 | Saito et al. | .................. | 280/730.2 |
| 7,658,401 B2 * | 2/2010 | Valdez et al. | .............. | 280/730.2 |
| 8,408,591 B2 * | 4/2013 | Walston | ..................... | 280/730.2 |
| 2003/0178832 A1 * | 9/2003 | Dominissini et al. | ...... | 280/743.2 |
| 2003/0230878 A1 * | 12/2003 | Inoue | ......................... | 280/730.2 |
| 2007/0241542 A1 * | 10/2007 | Wallace | ...................... | 280/730.2 |
| 2008/0054605 A1 * | 3/2008 | Mitsuo et al. | .............. | 280/730.2 |
| 2009/0212537 A1 * | 8/2009 | Slaats et al. | ................ | 280/728.2 |
| 2012/0025502 A1 * | 2/2012 | Matsushita et al. | ........ | 280/730.2 |

FOREIGN PATENT DOCUMENTS

JP 2007-237864 9/2007

* cited by examiner

*Primary Examiner* — Barry Gooden, Jr.
(74) *Attorney, Agent, or Firm* — Brinks Gilson & Lione

(57) ABSTRACT

A curtain airbag capable for preventing occupant ejection from a vehicle, particularly in the vicinity of a rearmost seat, while reducing the output required of an inflator associated with the airbag. The curtain airbag is stored at an upper position on a side surface portion of the occupant compartment of the vehicle, so as to be inflated and deployed along the side surface portion. The curtain airbag includes an inflation region and a wide portion in the form of non-inflatable cloth. The wide portion is attached to a rear edge portion of the inflation region and also attached to at least one point of the vehicle rearward of a front-side pillar, the front-side pillar being located forward of rearmost side window. The wide portion has a shape that allows it to be strained, by the inflated and deployed inflation region, into a generally planar configuration over an assumed strike area of the rearmost side window.

8 Claims, 5 Drawing Sheets

Cross Section A-A

Cross Section B-B

CURTAIN AIRBAG

BACKGROUND

1. Field of the Invention

The present invention relates to a curtain airbag which is inflated and deployed along a side surface portion in an occupant compartment of a vehicle to protect an occupant in the event of a vehicle side impact crash or rollover (overturn).

2. Description of the Related Technology

In recent years, high levels of safety performance have been required of vehicles, and this tendency is common to countries around the world. At present, in each country in the world, vehicles are mostly standard-equipped with airbags as vehicle safety devices. Business companies involved in the development of vehicles have taken up "a further safety improvement" as an important theme in their development and, following this theme, new airbags are continually being developed.

Standards for evaluating vehicle safety differ from country to country, and each business company performs development such that its products can meet evaluation standards in many countries. For example, in the United States, which has the largest number of automobiles in the world, FMVSS (Federal Motor Vehicle Safety Standards) are issued by the NHTSA (National Highway Traffic Safety Administration). At present, in a Notice for Proposed Rulemaking (NPRM) for FMVSS planned to be issued by the NHTSA in future, the requirement of "reducing the probability of occupant ejection from a vehicle through a side window using an ejection mitigation system in the event of a side impact crash or rollover (overturn)" is proposed (FMVSS 226). The requirement can be met by providing a curtain airbag as a device intended to reduce ejection from a vehicle, which forms the ejection mitigation system.

A curtain airbag is an airbag disposed above a door so as to be inflated and deployed along vehicle side windows, upon the occurrence of an impact, to protect an occupant. When inflated and deployed, a typical curtain airbag is designed to have a pressure duration longer than that of a front airbag or the like. This is longer duration is needed because, if a rollover occurs subsequently to a side impact crash, the time during which an impact may occur is long. Thus, the curtain airbag is intended to restrain an occupant by retaining the inflated state thereof during the time of a rollover and prevent ejection from a vehicle.

To ensure the successful prevention of occupant ejection from a vehicle described above, the curtain airbag needs to be inflated and deployed while covering each of a plurality of side windows present in a side surface portion of the vehicle. For example, the curtain airbag described in Japanese Patent Application Laid-Open No. 2007-237864 is disposed in a 3-row-seat vehicle, and capable of covering even a fixed-type side window (so-called quarter window) lateral to a third-row seat.

However, to inflate a large-capacity airbag which covers even a portion lateral to a third-row seat such as the curtain airbag described in Japanese Patent Application Laid-Open No. 2007-237864, a high-output gas generator (inflator) is needed. In general, as represented by the third-row seat and the quarter window that are described above, a side window lateral to a rearmost seat mostly has a shape different from those of the other side windows forward thereof and an area smaller than those thereof. If an inflation region is excessively expanded so as to reach such a side window, the output of the inflator may need to be increased, resulting in increased manufacturing costs.

SUMMARY

In view of the above, the present invention provides a curtain airbag capable of providing improved performance to prevent occupant ejection from a vehicle, particularly in the vicinity of a rearmost seat, while suppressing the output required of an inflator.

To achieve the foregoing, a typical structure of a curtain airbag, according to the present invention, is a curtain airbag stored at an upper position on a side surface portion in a vehicle compartment so as to be inflated and deployed along the side surface portion. The curtain airbag includes: an inflation region, which receives a gas for inflation and deployment, to be inflated over and forward of a front-side pillar that is protruded forward of a rearmost window located lateral to a rearmost seat and inward of the rearmost window on a vehicle interior side; and a wide portion, in the form of cloth that is not inflated, attached to a rear edge portion of the inflation region while also being attached at least one point of the vehicle on a rearward side of the front-side pillar. The wide portion has a shape that allows it to be strained, by the inflated and deployed inflation region, into a generally planar configuration over an assumed strike area of the rearmost window, which is presumed to be struck by an occupant.

In accordance with this arrangement, when the inflation region is inflated and deployed, the wide portion located at the rear end thereof receives tension (tensile force) toward the middle of the vehicle so as to be strained into a generally planar configuration. The "shape" of the wide portion mentioned above means a shape in which such tension as to thus bring the wide portion into the generally planar configuration is applied. In other words, if the size of the wide portion is reduced to be not larger than a predetermined size, such a shape can be achieved. Since the presumed strike area of the rearmost window is covered with the wide portion strained into the generally planar configuration, in accordance with the foregoing structure, it is possible to prevent occupant ejection from the vehicle through the rearmost window without using the inflation region. Therefore, it is not necessary to increase the capacity of the inflation region, and it is possible to suppress the output required of the inflator.

The front-side and rear-side attachment positions of the foregoing wide portion are the positions protruded inward of the rearmost window on the vehicle interior side when the curtain airbag is inflated. Accordingly, the wide portion is allowed to be strained at a position away from the rearmost window, i.e., a position closer to the occupant, and cover the rearmost window. In this manner, the wide portion can promptly receive the occupant of the rearmost seat and reduce the amount of movement thereof from the seating position. Therefore, in the event of a rollover, it is possible to improve the performance ability to prevent the occupant from being ejected from the vehicle.

Preferably, the curtain airbag described above further includes: a tab for fixing an upper portion of the rear edge portion of the inflation region to a portion above the front-side pillar. In accordance with the arrangement, when the inflation region is inflated and deployed, a vicinity of the rear edge portion thereof is reliably superimposed on the front-side pillar. Therefore, it is possible to strain the wide portion attached to the rear edge portion at a position further away from the rearmost window.

According to the present invention, it is possible to provide a curtain airbag capable of providing an improved performance ability to prevent occupant ejection from the vehicle particularly in the vicinity of the rearmost seat, while suppressing the output required of an inflator.

DETAILED DESCRIPTION OF THE PREFERRED EMBODIMENTS

Figure 1A:
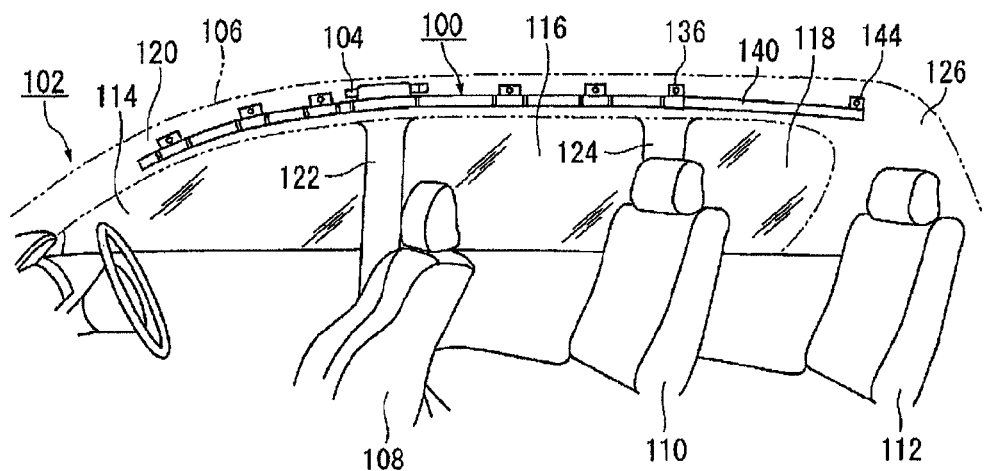
FIGS. 1(A) and 1(B) are views each illustrating a curtain airbag according to the present invention, prior to and after deployment, respectively.

Referring now to the accompanying drawings, preferred embodiments of the present invention will be described in detail. Dimensions, materials, other specific numerical values, and the like shown in such embodiments, are only shown illustratively, for easier understanding of the invention and not for limiting the present invention, unless particularly specified otherwise. Note that, in the present specification and drawings, components having substantially the same functions and structures are designated by the same reference numerals and a repeated description thereof is omitted. Accordingly features seen in one figure or embodiment are deemed applicable to other figures and embodiment, unless indicated to the contrary. As for components not directly related to the present invention, the depiction thereof is omitted.

Figure 1B:
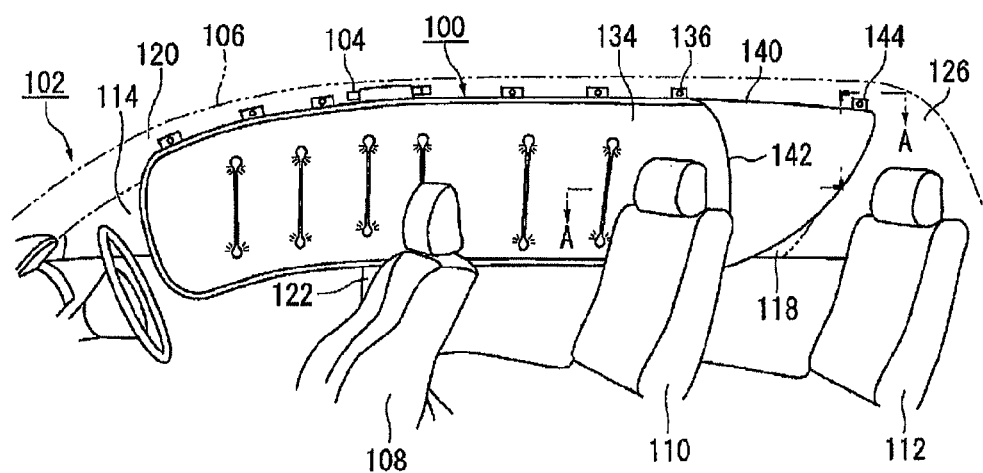

FIGS. 1A and 1B are views each illustrating a curtain airbag according to the present invention, of which FIG. 1A illustrates the curtain airbag (hereinbelow referred to as "airbag 100") when it is undeployed and FIG. 1B illustrates the airbag 100 when it is deployed. A description will be given below with reference to the curtain airbag for the right side surface of a vehicle 102, as shown in FIGS. 1A and 1B, but a curtain airbag for the left side surface thereof also has a structure similar and symmetrical thereto.

As illustrated in FIG. 1A, the airbag 100 includes an inflator 104 which is a gas generating device. The airbag 100 receives a gas for inflation and deployment (hereinafter simply referred to as "gas") supplied from the inflator 104 so as to be inflated to protect an occupant. In particular, the airbag 100 according to the present invention is capable of providing an improved performance ability to prevent occupant ejection from the vehicle in the vicinity of a rearmost seat, while suppressing the output required of the inflator 104 in such an arrangement.

The airbag 100 is attached in a rolled-up state as shown in FIG. 1A or in a folded state (not shown) to a roof side rail 106 (in the figure, illustrated by the imaginary line) located and stored in an upper portion of a side surface portion in an occupant compartment of a vehicle 102. Typically, the roof side rail 106 is covered with a roof trim, and invisible from inside the occupant compartment.

The airbag 100 is formed into a bag-like shape by sewing a base fabric, forming the surface thereof, in an outside-in state or by performing weaving using OPW (One-Piece Woven).

In the present embodiment, as a vehicle in which the airbag 100 is implemented, the vehicle 102 has 3-row seats (front seat 108, rear seat 110, and rearmost seat 112, shown in order from the vehicle front side). In the side surface portion of the vehicle 102, a plurality of side windows (side windows 114 and 116 and rearmost side window 118 shown in order from the vehicle front side) are disposed. In the vehicle compartment, the rearmost window 118 is located lateral to the rearmost seat 112.

In the front and rear direction of each of the side windows, a plurality of pillars (posts) supporting the roof (top) are connected, which are called an A-pillar 120, a B-pillar 122, a C-pillar (front-side pillar 124 described later), and a D-pillar (rear-side pillar 126 described later), proceeding from the front to the rear side of the vehicle 102.

When the vehicle 102 is involved in a side impact crash or rollover (turnover), following the sensing of an impact by a sensor (not shown) provided in the vehicle 102, an ignition signal is transmitted first to the inflator 104. Then, the ignition powder of the inflator 104 burns and the resulting gas is supplied to the airbag 100. On receiving the gas from the inflator 104, the airbag 100 is downwardly inflated and deployed along the side surface portion (the side windows) of the occupant compartment, as illustrated in FIG. 1B, to protect an occupant.

Figure 2:
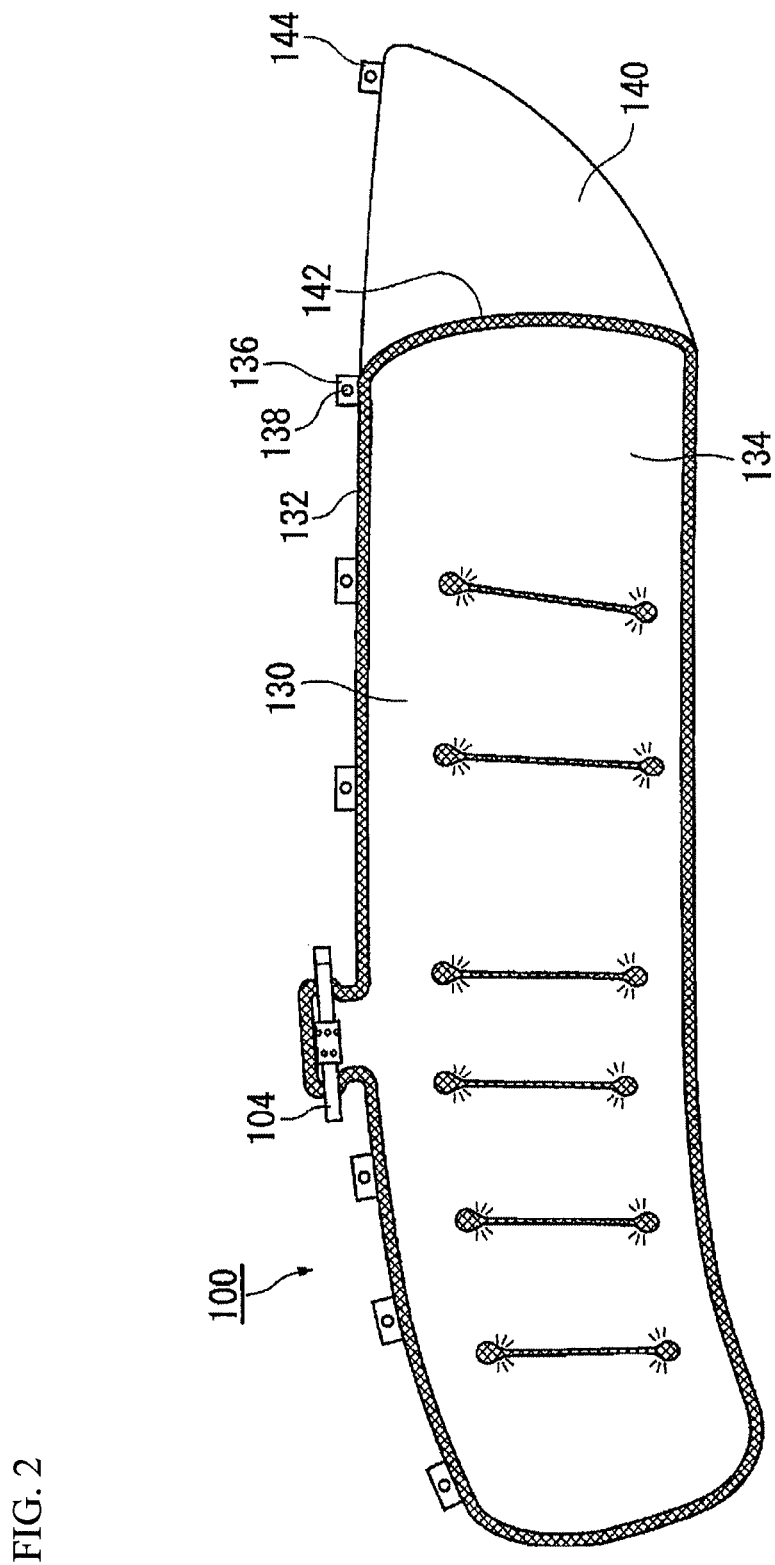
FIG. 2 is a view illustrating the curtain airbag of FIG. 1(B) in a deployed state.

FIG. 2 is a longitudinal, sectional view illustrating the curtain airbag of FIG. 1B in the deployed state. FIG. 2 illustrates the airbag 100 in a state where the occupant compartment side thereof is made partially transparent or shown cut away.

As illustrated in FIG. 2, the airbag 100 includes an inflation region 130 which is inflated when the vehicle 102 is involved in a crash or rollover, and a non-inflation region 132 (shown by cross-hatching in the figure), which is not inflated and defines the boundary of the inflation region 130. The inflation region 130 is partitioned into a plurality of chambers by the non-inflation region 132. The chambers are portions which come in direct contact with an occupant in the event of an emergency such as a crash.

Of the plurality of chambers, a rear chamber 134 is disposed at the rear end of the airbag 100 in the front-to-rear direction of the vehicle. As illustrated in FIG. 1B, the rear chamber 134 is inflated and deployed at a position substantially just beside the rear seat 110. Since the rear chamber 134 is inflated and deployed to a position closest to the occupant of the rear seat 110, the prevention of ejection of the occupant of the rear seat 110 from the vehicle is achieved by the rear chamber 134. It will be appreciated that the chambers (their reference numerals are omitted) located immediately forward of the rear chamber 134 are also effective in preventing the occupant of the rear seat 110 from being ejected from the vehicle.

The upper edge of the airbag 100 is provided with a plurality of tabs (such as a tab 136) as attachment members. The tab 136 is a belt-like member used to attach the airbag 100 to the vehicle 102. The tab 136 is provided with a bolt hole 138 through which a bolt is inserted for fastening to the vehicle 102.

As illustrated in FIG. 1B, in the airbag 100, the chambers are neither inflated nor deployed to a position lateral to the rearmost seat 112, but instead a wide portion 140 is deployed. The wide portion 140 is a portion intended to prevent the occupant of the rearmost seat 112 from being ejected from the vehicle through the rearmost window 118. As illustrated in FIG. 2, the wide portion 140 is attached to a rear edge portion 142 of the rear chamber 134 (or the inflation region 130). The wide portion 140 is in the form of wide cloth, and is not inflated, but rather is strained into a generally planar configuration to restrain the occupant.

In the present embodiment, the wide portion 140 has a generally triangular shape. The side of the wide portion 140 toward the front of the vehicle 102 is attached to the rear edge portion 142 of the rear chamber 134. The upper side of the wide portion 140 is along the roof side rail 106 or the rear-side pillar 126 (see FIG. 1B). Rearwardly of the upper side, a tab 144 is provided and attached to the rear-side pillar 126. The rear-side pillar 126 is a portion located rearward of the rearmost window 118 and protrudes inward of the rearmost window 118 toward the vehicle interior side (see FIG. 4). Note that the wide portion 140 may also be attached directly to the rear-side pillar 126 without using the tab 144.

The wide portion 140 has a shape sized to be strained into a generally planar configuration by the airbag 100 when the airbag 100 has been inflated and deployed. That is, the shape of the wide portion 140 is provided so as to have a size not larger than a predetermined size such that tension to bring the wide portion 140 into the generally planar configuration is applied from the air bag 100 when the airbag 100 has been inflated and deployed toward the interior of the vehicle. In other words, if the size of the wide portion 140 is reduced to be not larger than the predetermined size, such a shape can be achieved. In the present embodiment, by forming the wide portion 140 in the shape of the foregoing size, as illustrated in FIG. 1B, the wide portion 140 is strained into the generally planar configuration capable of covering an presumed strike area E (see FIG. 3) of the rearmost window 118, which is further described below.

Figure 3:
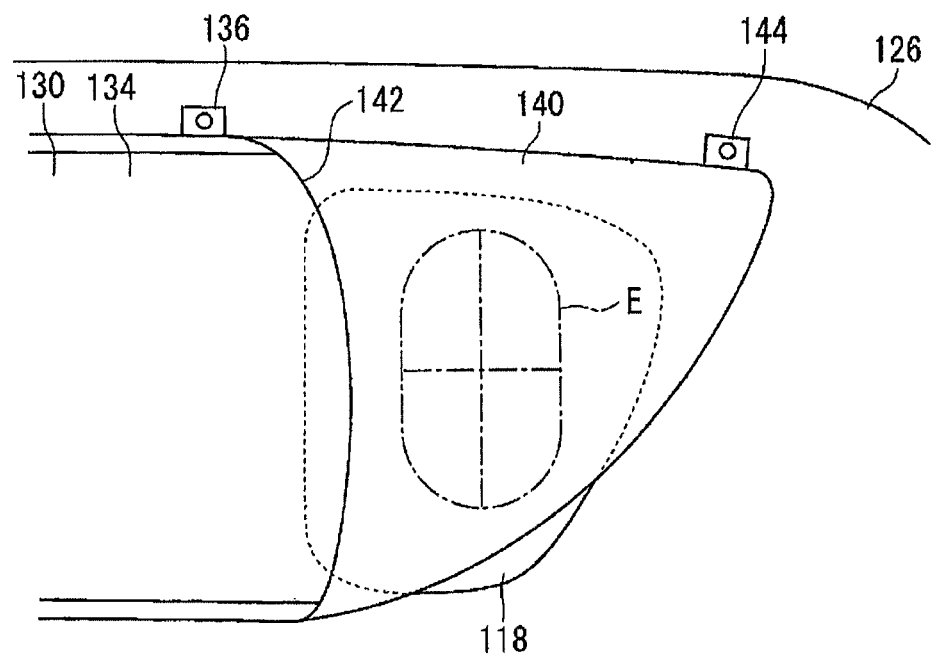
FIG. 3 is a partially enlarged view of a portion of the airbag seen in FIG. 2.

FIG. 3 is a partially enlarged view of FIG. 2. As illustrated in FIG. 3, to allow the wide portion 140 to prevent occupant ejection from the vehicle through the rearmost window 118, it is sufficient, for a region produced in the wide portion 140 that is strained into the generally planar configuration, to cover the surface area of the rearmost window 118 through which the head portion of the occupant may be exposed to the outside of the vehicle, i.e., the assumed strike area E. The assumed strike area E means an area assumed to be struck by the occupant's head portion in the event of a side impact crash, which has been determined according to FMVSS (Federal Motor Vehicle Safety Standards). The Ejection impactor is defined by the Ejection mitigation test device specifications in section 7 in FMVSS226. The Target locations are defined by the Determination of impact target locations in section 5.2 in FMVSS226. In particular, the assumed strike area E is defined as the area where the Ejection impactor has the potential to go through the window in the ejection mitigation test. Normally, at the time of a side impact crash test based on FMVSS, an impactor as a test device is caused to strike the assumed strike area E to test the safety performance of a safety device such as a curtain airbag.

In the present embodiment, the wide portion 140 is attached to an upper portion of the rear-side pillar 126 by means of the tab 144, but it is not limited thereto. It is sufficient if the wide portion 140 is attached at least one point to the vehicle 102 on the rearward side of the front-side pillar 124. The point serves as an apex, when the region that is strained into the generally planar configuration while covering at least the assumed strike area E is produced between the rear edge portion 142 of the rear chamber 134 and the rear-side pillar 126. Thus, it is not necessary for the entire wide portion 140 to cover the rearmost window 118 and, if the region that is strained into the generally planar configuration can cover the assumed strike area E, the position of attachment to the rear-side pillar 126 may be changed appropriately. The wide portion 140 is sufficient if it covers the main region of the assumed strike area E, and need not necessarily cover the entire assumed strike area E.

In the present embodiment, the wide portion 140 is designed to have a generally triangular shape. In other words, the generally triangular shape is a generally triangular shape in which both the upper and lower ends of the portion attached to the rear edge portion 142 of the inflation region 130 are connected by substantially straight lines to the point at which the wide portion 140 is attached to the rear-side pillar 126. With such a shape, when the inflation region 130 is deployed, the wide portion 140 can be deployed into the planar configuration with no slack. However, it is also possible to provide any additional shape around the generally triangular shape brought into the planar configuration to increase the area of the entire wide portion. This is because, even when the area is increased, the function of the triangular region of being strained into the planar configuration over the assumed strike area E is not lost.

Figure 4:
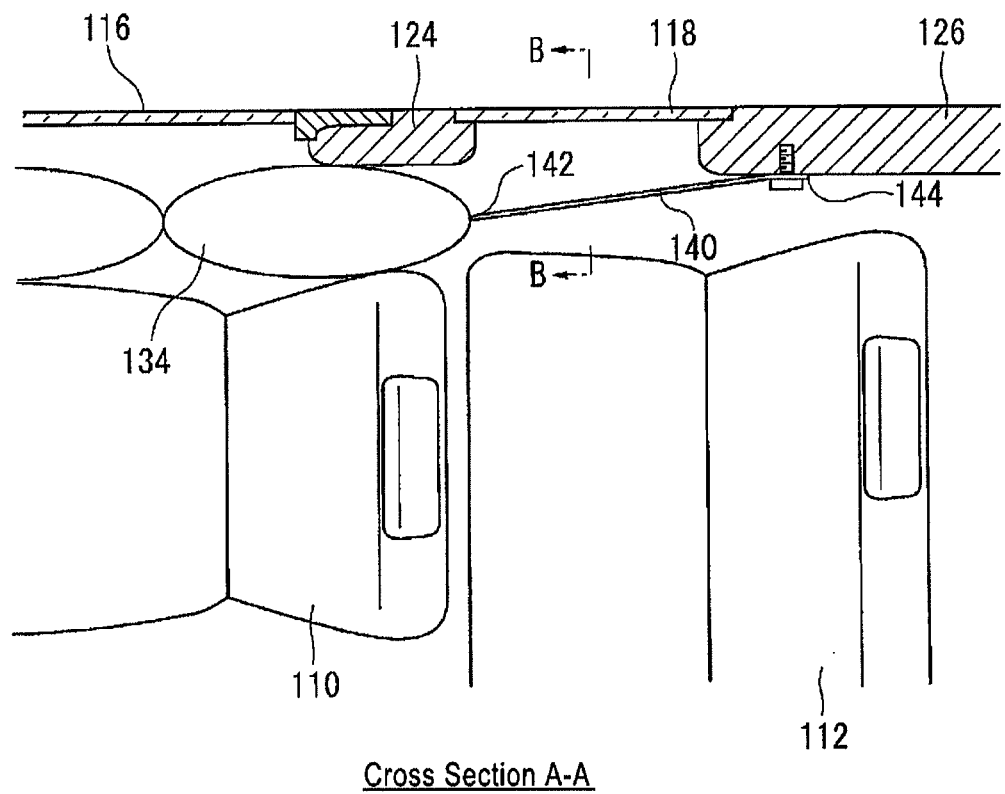
FIG. 4 is a schematic cross-sectional view generally taken along line A-A in FIG. 1(B)

FIG. 4 is a schematic A-A cross-sectional view of FIG. 1B. As illustrated in FIG. 4, in the airbag 100, the wide portion 140 is attached to the rear edge portion 142 of the rear chamber 134. The behavior of the airbag 100 when it is deployed differs depending on the size thereof or the position of attachment to the roof side rail 106, but it is provided that, when the airbag 100 is inflated and deployed from the rolled-up state, the rear edge portion 142 moves forward from the initial position thereof. In that case, the shape of the wide portion 140 is set smaller than the dimension from the position of attachment (tab 144) on the rear-side pillar 126 to the position to which the rear edge portion 142 will move through the inflation and deployment of the inflation region 130. That is, the shape of the wide portion 140 is small enough to inhibit the rear edge portion 142 from moving fully forward toward a position it would otherwise achieve absent the wide portion 140. Consequently, after the inflation and deployment, the wide portion 140 is strained into the generally planar configuration in such a manner as to be pulled toward the front of the vehicle by the rear edge portion 142.

As illustrated in FIG. 2, above the upper portion of the rear edge portion 142 of the rear chamber 134 to which the front side of the wide portion 140 is attached, the tab 136 is provided. As illustrated in FIG. 1A, the tab 136 is fixed to a portion above the front-side pillar 124. The front-side pillar 124 is located forward of the rearmost window 118 and protrudes inward of the rearmost window 118 toward the interior of the vehicle, as illustrated in FIG. 4. As a result, the rear chamber 134 (inflation region 130) is inflated over and forward of the front-side pillar 124 so that the vicinity of the rear-edge portion 142 is reliably superimposed on the front-side pillar 124. After the inflation and deployment of the airbag 100, the wide portion 140 is strained between the rear-side pillar 126 protruded inward of the rearmost window 118 on the vehicle interior side and the rear edge portion 142 of the rear chamber 134 similarly protruded inward of the rearmost window 118 on the vehicle interior side, to assume a generally planar attitude (see FIG. 5).

Figure 5:
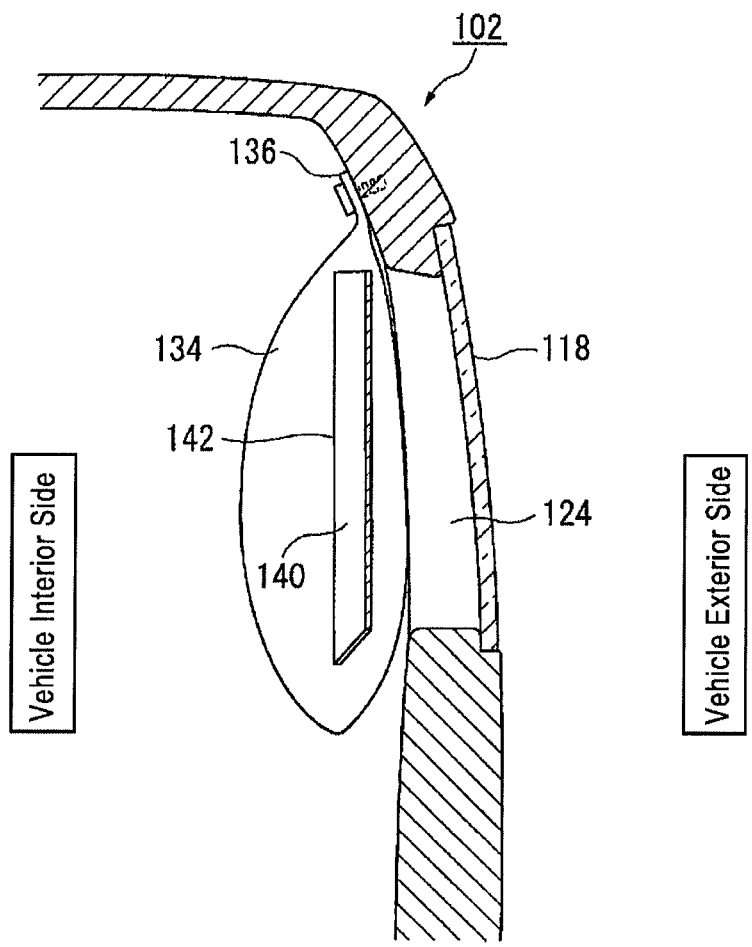
FIG. 5 is a schematic cross-sectional view generally taken along line B-B in FIG. 4.

FIG. 5 is a schematic cross-sectional view generally taken along line B-B of FIG. 4. By setting the front-side and rear-side attachment positions of the wide portion 140 at locations inwardly protruded on the vehicle interior side, the wide portion 140 covers the rearmost window 118 at a position inwardly away from the rearmost window 118 on the vehicle interior side, i.e., at a position closer to the occupant, as illustrated in FIG. 5. This allows the wide portion 140 to meet, e.g., the rules of FMVSS and promptly receive the occupant of the rearmost seat 112 to allow a reduction in the amount of movement thereof from the seating position. Therefore, in the event of a rollover, it is possible to improve the performance ability to prevent the occupant from being ejected from the vehicle.

As described above, according to the airbag 100, it is possible to prevent occupant ejection from the vehicle through the rearmost window 118 using the wide portion 140, not the chambers (inflation region 130). Therefore, the capacity of the inflation region 130 need not be increased so as to reach the rearmost window 118, and thus the output required of the inflator 104 can be suppressed.

Note that, in the present embodiment, the airbag 100 is implemented in the vehicle 102 having the 3-row seats, but the vehicles in which the airbag 100 can be implemented is not limited to vehicles with 3-row seats. The technology according to the present invention is also applicable to a vehicle having another window rearward of the window located lateral to the rearmost seat. In addition, the target side window for which the wide portion 104 is intended to prevent occupant ejection from the vehicle therethrough can have any shape.

Although the preferred embodiments of the present invention has been described heretofore with reference to the accompanying drawings, the embodiments described herein above are preferred examples of the present invention, and embodiments other than these can also be implemented or carried out in various methods. The present invention is not limited to the shapes, sizes, configurations, arrangements, and the like of components shown in detail in the accompanying drawings unless particularly stated in this specification that the present invention is limited thereto. The expressions and terms used in this specification are intended for explanatory purposes, and not limited thereto unless particularly stated that they are limited.

Therefore, it is obvious that those skilled in the art can devise various changes or modifications within a scope stated in claims, and it should be naturally understood that these changes or modifications also belong to the technical scope of the present invention.

In the foregoing embodiments, the description has been given to the example in which the curtain airbag according to the present invention is applied to automobiles. However, the curtain airbag according to the present invention is also applicable to aircraft, ships, and the like besides automobiles, and the same function/effect can be obtained.

The present invention can be used as a curtain airbag which is inflated and deployed along a side surface portion in a vehicle compartment to protect an occupant in the event of a vehicle side impact crash or rollover (turnover).

What is claimed is:

1. A curtain airbag stored at an upper position on a side surface portion in an occupant compartment of a vehicle and configured to be inflated and deployed along the side surface portion, the curtain airbag comprising:
   an inflation region having an upper edge and a rearmost inflation chamber that has a rear edge portion protruding inward of a rearmost side window of the vehicle, a portion of the upper edge is located along the rearmost inflation chamber and is attached to the vehicle by a tab immediately above a front-side pillar forming a rearmost attachment of the rearmost inflation chamber close to the rear edge portion, the rearmost inflation chamber being configured to receive a gas for inflation and deployment so as to be inflated over and forward of the front-side pillar which is located forward and inward of the rearmost side window that is lateral to a rearmost seat; and
   a wide portion in the form of cloth which is not inflated, the wide portion is connected to the rear edge portion of the rearmost inflation chamber and is attached to the vehicle by a rear side attachment toward a rearward side of the rearmost side window, the rear side attachment defines a rearmost point of attachment of the curtain airbag to the vehicle, the rear side attachment is located at a position protruded inward of the rearmost side window of the vehicle, the rear side attachment is provided along an upper edge of the wide portion, the rear edge portion and the wide portion are provided at a location between the rear side attachment and the tab, the wide portion is unattached to the vehicle between the rear side attachment and the rear edge portion of the rearmost inflation chamber over the rearmost side window, wherein
   the wide portion has a dimension and a shape as to allow it to be strained, by the inflated and deployed inflation region, into a generally planar configuration over an assumed strike area of the rearmost side window which is assumed to be struck by an occupant, the dimension of the wide portion in a non-inflated state of the curtain airbag is smaller than a dimension from the rear side attachment to a location where the rear edge portion of the rearmost inflation chamber would move absent the wide portion.

2. The curtain airbag according to claim 1 wherein the wide portion is generally triangular in shape.

3. In a vehicle having an upper position on a side surface portion of an occupant compartment of the vehicle, the vehicle having a rearmost seat and a rearmost side window located laterally from the rearmost seat, the vehicle also having a front-side pillar located forward of the rearmost side window and a rear-side pillar located rearward of the rearmost side window, a curtain airbag configured to be inflated and deployed along the side surface portion, the curtain airbag comprising:
   an inflation region configured to receive a gas for inflation and deployment so as to be inflated over and forward of the front-side pillar and inward of the rearmost side window toward the occupant compartment of the vehicle, the inflation region having a rearmost inflation chamber being attached to the vehicle along an upper edge of the rearmost inflation chamber by a first tab located immediately above the front-side pillar and protruding inwardly of the rearmost side window the first tab forming a rearmost attachment of the rearmost inflation chamber; and
   a wide portion in the form of non-inflatable cloth, the wide portion being connected to a rear edge portion of the rearmost inflation chamber, the wide portion being attached to the vehicle toward a rearward side of the rearmost side window by a rear side attachment that is in the form of a second tab defining a rearmost point of attachment for the curtain airbag to the vehicle, the rear side attachment being provided along an upper edge of the wide portion, the rear side attachment being located at a position protruded inward of the rearmost side window of the vehicle, the rear edge portion and the wide portion being provided at a location between the rear side attachment and the first tab, the upper edge of the wide portion being unattached to the vehicle between the rear side attachment and the rear edge portion of the rearmost inflation chamber over the rearmost side window, wherein the wide portion has a dimension and a shape restricting forward movement of the rear edge portion of the rearmost inflation chamber when inflated and deployed, the dimension of the wide portion in a non-inflation state of the curtain airbag being smaller than a dimension from the rear side attachment to a location where the rear edge portion of the rearmost inflation chamber would move absent the wide portion such that the wide portion is strained into a generally planar configuration over a presumed strike area of the rearmost side window which is presumed to be struck by an occupant during a rollover of the vehicle.

4. The curtain airbag according to claim 3, wherein the wide portion is generally triangular in shape.

5. A curtain airbag comprising:
an inflation region configured to receive a gas for inflation and deployment so as to be inflated in an occupant compartment of a vehicle over a side window thereof, the inflation region having a plurality of inflatable chambers including a rearmost inflation chamber defining a rear edge portion, the rear edge portion being located perpendicularly to an attachment portion provided along an upper edge of the rearmost inflation chamber close to the rear edge portion and for attaching the curtain airbag immediately above a front-side pillar of the vehicle, the attachment portion forming a rearmost attachment of the rearmost inflation chamber immediately above the front-side pillar, the attachment portion including a tab extending therefrom; and
a non-inflatable wide portion, the wide portion being in the form of a panel and being connected to the rear edge portion of the rearmost inflation chamber, the wide portion also having along an upper edge thereof a rear side attachment configured to be an only point of attachment of the wide portion to the vehicle and being generally provided on an end of the wide portion opposite of the rear edge portion and located inward of the rearmost side window, the curtain airbag configured to be unattached to the vehicle between the rear edge portion of the rearmost inflation chamber and the rear side attachment over the rearmost side window; and
whereby when the rearmost inflation chamber is inflated and deployed, absent the wide portion the rear edge portion is configured to be deployed in the forward direction by a dimension that is greater than a dimension of the wide portion in a non-inflated state of the curtain airbag from the rear side attachment to the rear edge portion of the rearmost inflation chamber, and the rear edge portion, wherein the wide portion is strained into a generally planar configuration over a presumed strike area of the rearmost side window which is presumed to be struck by an occupant during a rollover of the vehicle.

6. The curtain airbag according to claim 5, wherein the attachment portion is located generally adjacent to the rear edge portion of the rearmost inflation chamber.

7. The curtain airbag according to claim 5, wherein the wide portion is generally triangular in shape.

8. The curtain airbag according to claim 5 wherein the rearmost inflation chamber is configured to inflate over and forward of the front-side pillar protruding inward of the rearmost side window toward the interior of the vehicle, after inflation and deployment of the curtain airbag, the wide portion being strained between a rear side pillar protruding inward from the rearmost side window on the interior side and the rear edge portion of the rearmost inflation chamber.

* * * * *